United States Patent [19]

Harris

[11] 4,122,557
[45] Oct. 31, 1978

[54] INCINERATOR

[76] Inventor: Frank N. Harris, 7700 SW. 69th Ave., Portland, Oreg. 97223

[21] Appl. No.: 820,347

[22] Filed: Jul. 29, 1977

[51] Int. Cl.² .......................................... A47K 11/02
[52] U.S. Cl. .................................. 4/111.3; 4/111.1; 4/111.4
[58] Field of Search .......................... 4/131, 118, 111; 110/9 R, 9 E, 8 R, 8 E

[56] References Cited

U.S. PATENT DOCUMENTS

| | | | |
|---|---|---|---|
| 3,319,588 | 5/1967 | Duncan | 110/9 R |
| 3,320,907 | 5/1967 | Duncan | 4/131 |
| 3,858,251 | 1/1975 | Vollrath et al. | 4/131 |
| 3,943,579 | 3/1976 | Blankenship | 4/131 |

Primary Examiner—Richard E. Aegerter
Assistant Examiner—L. Footland
Attorney, Agent, or Firm—Klarquist, Sparkman, Campbell, Leigh, Hall & Whinston

[57] ABSTRACT

The specification discloses an incinerator toilet having a seat mounted on a heat insulated bowl with an upper tapered baffle in the bowl extending down to a lower tapered baffle. A fuel nozzle from a fuel pump injects fuel chordally into the space between the lower baffle and the bowl past a spark plug, which ignites the fuel, air being blown in with the fuel by a lower blower having an outlet coaxial with the nozzle. A second blower blows air into an annular passage at the upper end of the bowl, and this air travels into and down the upper baffle. The air and the products of combustion are exhausted through an exit port through the bowl positioned above the lower baffle. When a cover is placed in the opening to close a limit switch and a push button is held closed, an igniter circuit, the fuel pump motor and the lower blower are energized. If flame is present, the circuit is locked in by a timer and the upper blower is energized. After an incineration period expires, the timer drops out the fuel pump motor and the igniter, and increases the speed of the lower blower during a cooling cycle. Then, when the chamber temperature is lowered to a desired point, a temperature sensor drops out the upper blower and resets the circuit.

12 Claims, 7 Drawing Figures

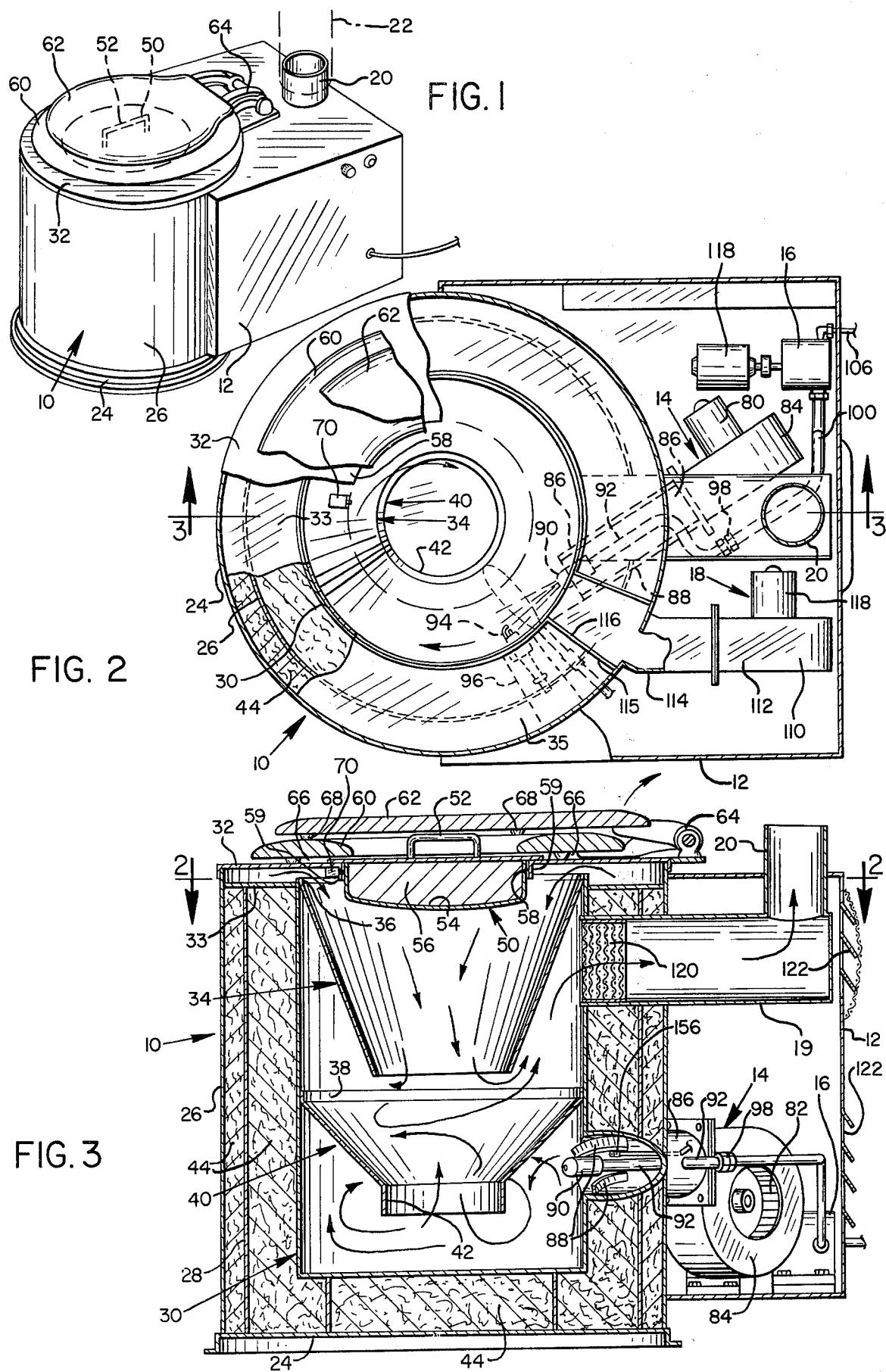

INCINERATOR

DESCRIPTION

This invention relates to an improved incinerator toilet, and has for an object thereof the provision of a new and improved incinerator toilet.

Another object of the invention is to provide an incinerator toilet in which air and fuel are blown tangentially past an igniter.

A further object of the invention is to provide an incinerator toilet in which fuel and air are injected into the lower part of a bowl and additional air is blown downwardly from the upper portion of the bowl.

Another object of the invention is to provide an incinerator toilet having upper and lower funnel-like baffles in a bowl, fuel and air being introduced into and ignited in the bowl below the lower baffle, further air being blown into the upper part of the bowl and the air and products of combustion being exhausted at a point behind the upper baffle.

Another object of the invention is to provide an incinerator toilet in which a manual control starts an igniter, a fuel pump and a blower motor to cause fuel and air to be injected into a bowl, past the igniter, and a timer circuit keeps all in operation for a predetermined period of time provided a cover is in place and the fuel is ignited.

In the drawings:

FIG. 1 is a perspective view of an improved incinerator toilet forming one embodiment of the invention;

FIG. 2 is an enlarged top plan view with portions broken away of the toilet of FIG. 1;

FIG. 3 is a vertical, sectional view taken along line 3—3 of FIG. 2;

Figure 4:
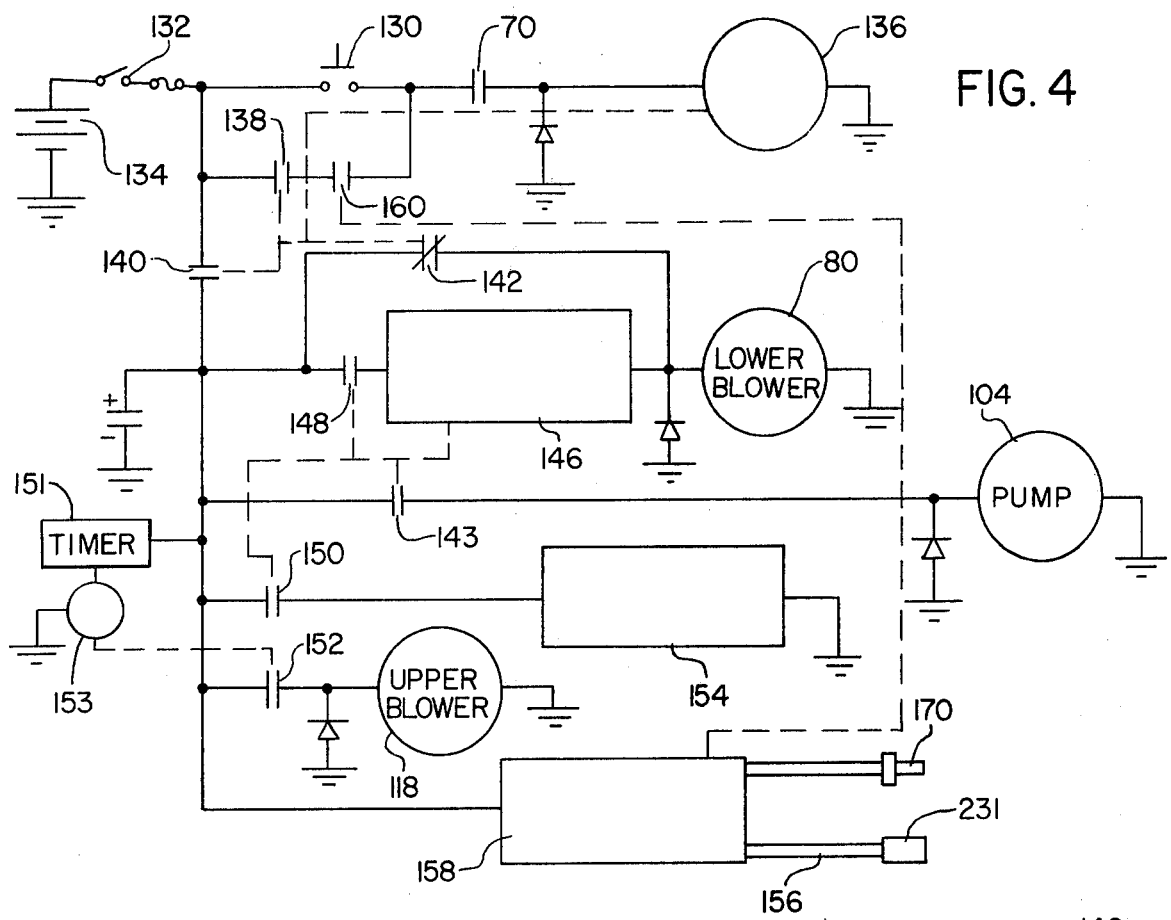
FIG. 4 is a schematic view of a control circuit of the toilet of FIG. 1.

A marine toilet forming one specific embodiment of the invention includes a bowl 10 and a generally U-shaped housing 12, in which are mounted a lower blower 14, a fuel pump 16, an upper blower 18 and an exhaust conduit 19 leading to a vent pipe 20 to which a vent stack 22 may be connected. The bowl includes a base 24, a cylindrical outer shell 26, a cylindrical intermediate shell 28 and an inner cup-like shell 30, all preferably being constructed of stainless steel or chronized steel. A channel-like top ring 32 rests on the outer shell and is supported above a cover ring 33 welded to the three shells to form an annular upper passage 35 opening into an upper frustoconical baffle 34 welded to the upper end of the inner shell along a cylindrical flange 36 of the baffle. A cylindrical rim portion 38 of a lower frustoconical baffle 40 is welded to the central portion of the inner shell just below lower end of the upper baffle and has a short cylindrical lower end portion 42. Heat insulating material 44 fills the spaces between the shells.

An insulated cover 50 having a handle 52 and a hollow chamber 54 filled with heat insulating material 56 is removable from opening 58 into the bowl 10 formed by flange 59. A toilet seat 60 and a seat cover 62 are mounted by hinge 64 on the top ring 32. Pads 66 and 68 keep the cover 62 up sufficiently to provide clearance for the handle 52. A limit switch 70 is actuated by the cover 50 when the latter is in its position closing the opening 58.

The lower blower includes an electric motor 80 adapted to drive a rotor 82 of a centrifugal blower or fan 84 to blow a large quantity of air through an inlet pipe 86 having spiralling blades 88 to cause the air to be blown in a swirling, generally cylindrical stream tangentially into the bowl 30 above the bottom of the lower baffle 40. The pipe 86 is welded to the shell 30. A diesel fuel nozzle 90 carried by a pipe 92 welded to the inlet pipe 86 is coaxial with the pipe 86, and directs diesel fuel into the stream of air substantially tangentially past a spark plug 94 screwed into a tubular sleeve or socket 96. A union 98 connects the pipe 92 to a pipe 100 from the pump 16 which is driven by electric motor 104. A pipe 106 leading from a tank of diesel fuel supplies the fuel to the inlet of the pump.

The upper blower 18 includes a centrifugal blower or fan 110 having a flanged outlet 112 connected to flanged pipe 114 welded to the outer shell 26 and adapted to deliver air to a flattened duct portion 115 having an upwardly facing outlet 116 opening into the annular upper passage 35. An electric motor 118 drives the rotor of the blower. The air travels around the passage 35 and is deflected by the flange 59 down along the inner face of the baffle 34 and into the baffle 40 to supply oxygen to the fire zone which is at the lower portion of the baffle 40, inside and out. The products of combustion and excess air flow around the baffle 34 and out the exhaust duct through a spark arresting screen 120 mounted in the inlet of the exhaust pipe 19. Screened, louvered, air inlets 122 are provided at the rear of the housing 12.

After the toilet is used, the user replaces the cover 50 to close switch 70, and the user then presses momentary switch 130 (FIG. 4), a master switch 132 having previously been set in a closed position to connect the switch 130 to a source of electrical power 134. This energizes relay winding 136 to close holding contacts 138 and 140. Closing contacts 140 causes energization of pump motor 104 through relay contacts 143 controlled by blower control circuit 146 which closes holding contacts 148 and closes contacts 150. Closing of the contacts 140 causes energization of blower motor 118 to start to pump fuel and also causes energization of igniter circuit 154 to supply spark to the spark plug 94 to ignite the fuel. If the fuel is ignited, its flame is detected by a flame sensor 156, and a relay in a timer control circuit 158 closes holding contacts 160. The momentary switch 130 then is released. After 10 seconds, a timer 151 actuates relay winding 153 to close contacts 152 to energize the top blower motor 118 which runs until the end of the cycle. A timer in the circuit 158 times out after, for example, three minutes to drop the relays controlling the contacts 148 and 150 to open these contacts. This stops the fuel pump motor 104, stops the igniter circuit 154 and changes energization of the blower motor 80 from half speed as it is operated during combustion through contacts 148 and circuit 146 to full speed energization of the motor 80 through the contacts 142. This expedites cooling down the incinerator. The blower motor 80 continues to run until the chamber cools to a temperature below 140° F. at which time a temperature sensor 170 drops out the contacts 160 to drop out relay winding 136.

Figure 5:
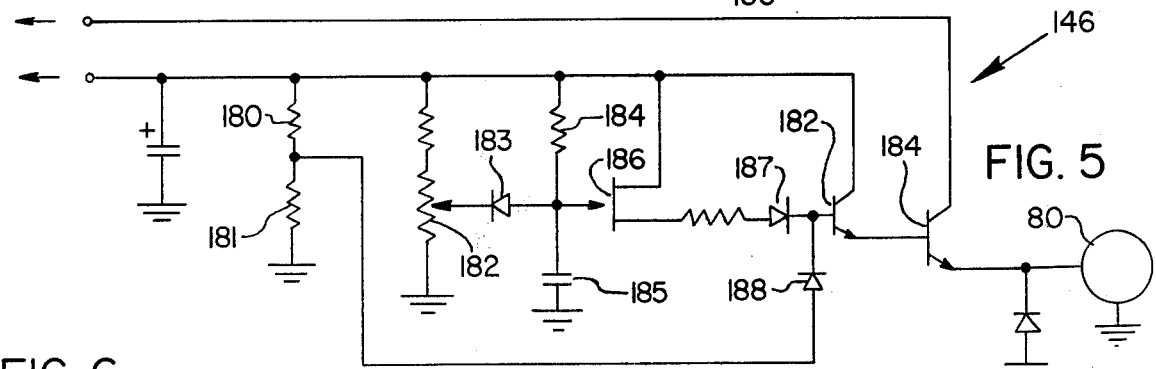
FIGS. 5, 6 and 7 are wiring diagrams of portions of the circuit of FIG. 4.

In the ramp control circuit 146, power amplifiers 182 and 184 (FIG. 5) drive blower motor 80. When power is applied to the ramp, circuit voltage divider 180 and 181 supply a small voltage (2.v.o.c. nominal) to amplifier 182 through diode 188. This voltage causes motor 80 to turn at a very slow idling r.p.m. The air movement at this speed allows the fuel to ignite and begin to heat the chamber. When power is applied to the ramp circuit capacitor 185, it begins to change through resistor 184. After about 4 seconds, the charge voltage on capacitor 185 reaches more than 2 volts and through field effect transistor 186 which has a very high input impedance to minimize loading. Capacitor 185 begins to forward bias diode 187 and reverse bias diode 188. As this takes place, motor 80 begins to increase in speed and causes the flame inside the chamber to increase in heat. Capacitor 185 continues to charge toward the supply voltage until diode 183 becomes forward biased at a voltage set by voltage dividers 108–181. At this point, motor 80 stops increasing in speed and continues to run at this r.p.m. for the rest of the burn cycle. This motor r.p.m. applied to the blower determines the maximum heating rate possible inside the chamber.

Figure 6:
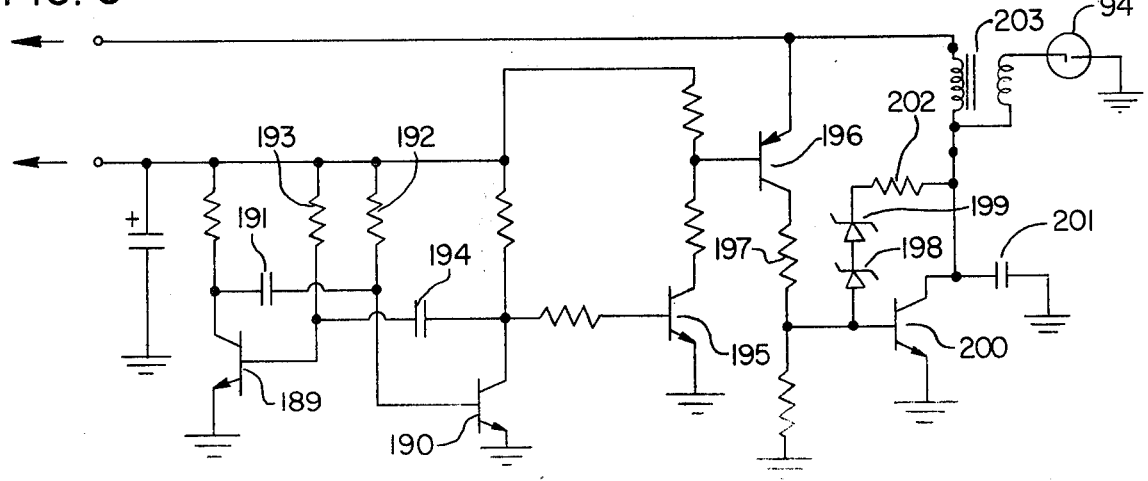

Transistors 189 and 190 (FIG. 6) form a square wave oscillator with the free running frequency determined by resistors 192 and 193 and capacitors 191 and 194. The capacitors 191 and 194 are of different values such that the pulse width at the collector of transistor 190 is 25% of the total pulse width. The square wave from the oscillator drives transistor 195 which, in turn, drives transistor 196 at a higher current than the input of transistor 195. Transistor 196 drives transistor 200 at a current of 1 ampere input which is controlled by resistor 197. Transistor 200 saturates the primary winding of coil 203 which is an automotive ignition coil.

At the end of the square wave pulse from the collector of transistor 190, the three amplifier transistors 195, 196 and 200 cease to draw current or, in effect, turn-off. When turn-off occurs, coil 203 rings (back EMF) in reasonance with capacitor 201 toward a peak voltage of approximately 300 volts. To protect transistor 200 from excess voltage, two-regulator diodes 198 and 199 in series with transistor 200 limit the peak voltage to 240 volts. The primary to secondary winding ratio of coil 203 is 1 to 100 which produces a secondary voltage of 24,000 volts. This voltage is applied to the spark plug to ignite the fuel. Since the spark plug sees this voltage once every 20 millisecond, the fuel is ignited on an almost continuous basis.

Figure 7:
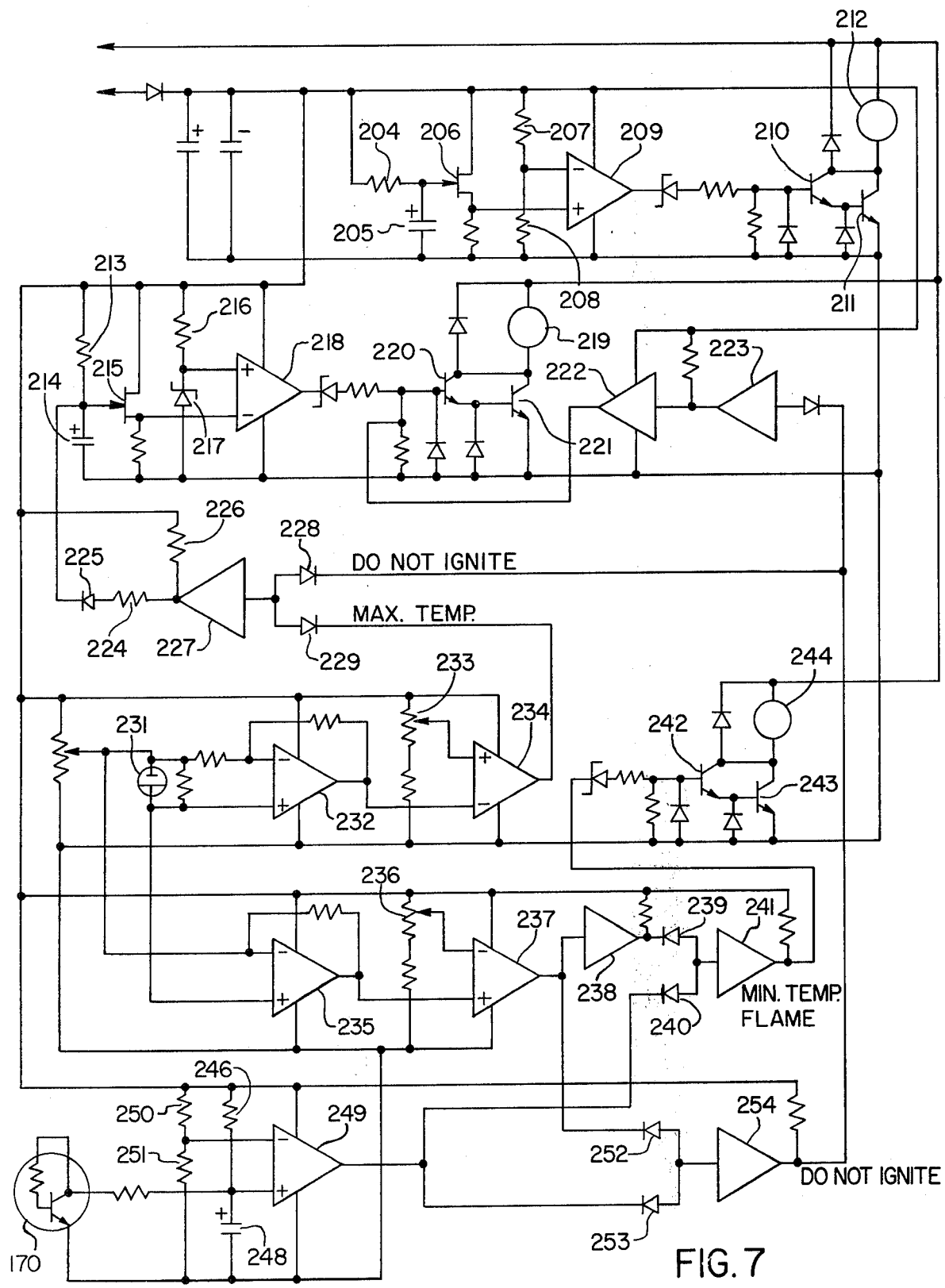

When power is applied, capacitor 205 (FIG. 7) begins charging toward the supply voltage through resistor 204. Field effect transistor 206 senses this voltage and drives the positive input of integrated circuit 209. When the positive input voltage is higher than the negative reference voltage determined by resistors 207 and 208, the output of 209 goes up positively (about 10 seconds) and turn transistors 210 and 211 on. This pulls in relay 212 which turns on blower 118. Blower 118 continues to run for the rest of the cycle.

When power is applied, capacitor 214 begins charging toward the supply voltage through resistor 213. Field effect transistor 215 senses this voltage and drives the negative input of integrated circuit 218. When the negative input voltage is higher than the positive reference voltage determined by resistors 216 and 217, in about 5 minutes, the output of circuit 218 goes negative and turns transistors 220 and 221 off. This drops out relay 219 which turns off the pump motor 104 and the igniter 154. Relay 219 also turns off the ramp control circuit 146 through contacts 148 and applies full power to blower motor 80 through contacts 142. Blower motor 80 runs at this top speed for the rest of the cycle for maximum cooling.

When power is applied and ignition of the fuel is accomplished, temperature sensor 231 senses the internal heat and begins to produce a small output voltage. As the voltage of sensor 231 increases with temperature, integrated circuit 232 amplifies it and integrated circuit 234 compares the output of circuit 232, and compares this voltage to its reference determined by resistor 213. When the output of circuit 232 is more positive than the reference, the output of circuit 234 goes negative. This forwardly biases diode 229 and turns off integrated circuit 227. When circuit 227 is turned off, diode 225 is forwardly biased and charges capacitor 214 at a very rapid rate through resistors 224 and 226. This causes relay 219 to drop out and start the cooling cycle. This function is called maximum temperature.

As the output voltage of temperature sensor 231 increases, integrated circuit 235 amplifies this voltage which is then applied to the input of integrated circuit 237. This voltage is compared to the reference determined by resistor 236 when it is more positive than the reference, the output of circuit 237 goes positive. This positive voltage turns integrated circuit 238 on which forwardly biases diod 239 and turns integrated circuit 241 off. When integrated circuit 241 is off, transistors 242 and 243 are turned off, which pulls in relay 244. Relay 244 must be pulled in in order for the burn or cooling cycles to continue. When the output of temperature sensor 231 drops below a predetermined value and flow is not present, relay 244 will drop out and end the cycle.

When ignition is accomplished, flame detecting temperature sensor 170 senses this and drops the voltage at the positive input of integrated circuit 249 lower than the reference voltage determined by the resistors 250 and 251. When this is accomplished, the output of circuit 249 goes negative. This forwardly biases diode 240 which turns off integrated circuit 241 and turns on transistors 242 and 243. This pulls in relay 244 and allows the cycle to continue. At the loss of flame, capacitor 248 charges positive through resistor 246 (one second) and causes the output of circuit 249 to go positive.

When the output of circuit 249 is positive and the output of circuit 237 is negative, the relay 244 drops out and stops the cycle.

When power is applied and ignition is not accomplished, within one second the flame detector 170 causes the output of the circuit 249 to go positive. If the output voltage of the temperature sensor 170 is above the predetermined value at this time, the outut of circuit 237 will be positive. With both of these outputs positive, diodes 252 and 253 will be reverse biased and will allow integrated circuit 254 to turn on. This forwardly biases diode 228, which, through the circuit 227, charges capacitor 214 positive and integrated circuit 223 is turned off at this time, which turns on integrated circuit 222. When the circuit 222 is turned on, transistors 220 and 221 cannot pull in relay 219. The pump motor 104 and the igniter 154 then will not run and since the output of integrated circuit 237 is positive, the relay 244 will pull in. This combination holds the cycle in cooling until the output of temperature sensor 170 is low enough to drop out relay 244 and end the cycle.

What is claimed is:
1. In an incinerator,
   a cylindrical, heat insulated bowl,
   a tapered baffle in the bowl above the bottom of the bowl, fuel injecting means for injecting fuel into the bowl below the baffle,
blower means for injecting air into the fuel,
means for igniting the fuel and air below the baffle,
and exhaust means for exhausting products of combustion,
the blower means including a tubular outlet directed substantially tangentially into the bowl,
the fuel injecting means including a nozzle coaxial with the tubular outlet of the blower means.

2. In an incinerator,
a cylindrical, heat insulated bowl,
a tapered baffle in the bowl above the bottom of the bowl,
fuel injecting means for injecting fuel into the bowl below the baffle,
blower means for injecting air into the fuel,
means for igniting the fuel and air below the baffle,
exhaust means for exhausting products of combustion,
the blower means including an outlet directed substantially tangentially into the bowl,
a second tapered baffle positioned above and spaced from the first-mentioned baffle,
and second blower means for injecting air into the upper portion of the bowl and downwardly through the second tapered baffle.

3. The incinerator of claim 2 wherein the second blower means includes an annular entrance chamber extending around the upper end of the bowl.

4. The incinerator of claim 3 wherein the exhaust means has an inlet positioned between the baffles.

5. The incinerator of claim 4 including a removable cover for the bowl and toilet seat means for the bowl.

6. The incinerator of claim 2 wherein the exhaust means has an inlet positioned between the baffles.

7. In an incinerator,
a cylindrical, heat insulated bowl,
a tapered baffle in the bowl above the bottom of the bowl,
fuel injecting means for injecting fuel into the bowl below the baffle,
blower means for injecting air into the fuel,
means for igniting the fuel and air below the baffle,
and exhaust means for exhausting products of combustion,
the blower means including an outlet directed substantially tangentially into the bowl,
the fuel injection means including a nozzle coaxial with the outlet of the blower means,
the blower means including spiral swirling blades.

8. In an incinerator,
a cylindrical, heat insulated bowl,
a tapered baffle in the bowl above the bottom of the bowl,
fuel injecting means for injecting fuel into the bowl below the baffle.
blower means for injecting air into the fuel,
means for igniting the fuel and air below the baffle,
exhaust means for exhausting products of combustion,
and a second tapered baffle positioned above and spaced from the first-mentioned baffle, the exhaust means having an inlet positioned between the baffles.

9. The incinerator of claim 8 including an upper blower means for injecting air into the bowl and downwardly through the second tapered baffle.

10. In an incinerator,
a cylindrical, heat insulated bowl,
a tapered baffle in the bowl above the bottom of the bowl,
fuel injecting means for injecting fuel into the bowl below the baffle,
blower means for injecting air into the fuel,
means for igniting the fuel and air below the baffle,
exhaust means for exhausting products of combustion,
control means operable when actuated to start and run the igniting means, the fuel injecting means and the blower means for a predetermined period of time,
a removable cover,
and sensing means operable by the cover when removed from a position closing the bowl for preventing operation of the fuel injecting means.

11. In an incinerator,
a cylindrical, heat insulated bowl,
a tapered baffle in the bowl above the bottom of the bowl,
fuel injecting means for injection fuel into the bowl below the baffle,
blower means for injecting air into the fuel,
means for igniting the fuel and air below the baffle,
exhaust means for exhausting products of combustion,
control means operable when actuated to start and run the igniting means, the fuel injecting means and the blower means for a predetermined period of time,
a second tapered baffle positioned above and spaced from the first-mentioned baffle,
and second blower means controlled by the control means for blowing air downwardly through the second tapered baffle.

12. The incinerator of claim 11 wherein the control means delays operation of the second blower means until a predetermined period of time after the first-mentioned blower means and the fuel-injecting means have been started.

* * * * *